Oct. 12, 1948.                L. E. LONG                 2,451,293
                  SUSPENSION FOR TANDEM WHEELED VEHICLES
Filed June 6, 1946                                   3 Sheets-Sheet 1
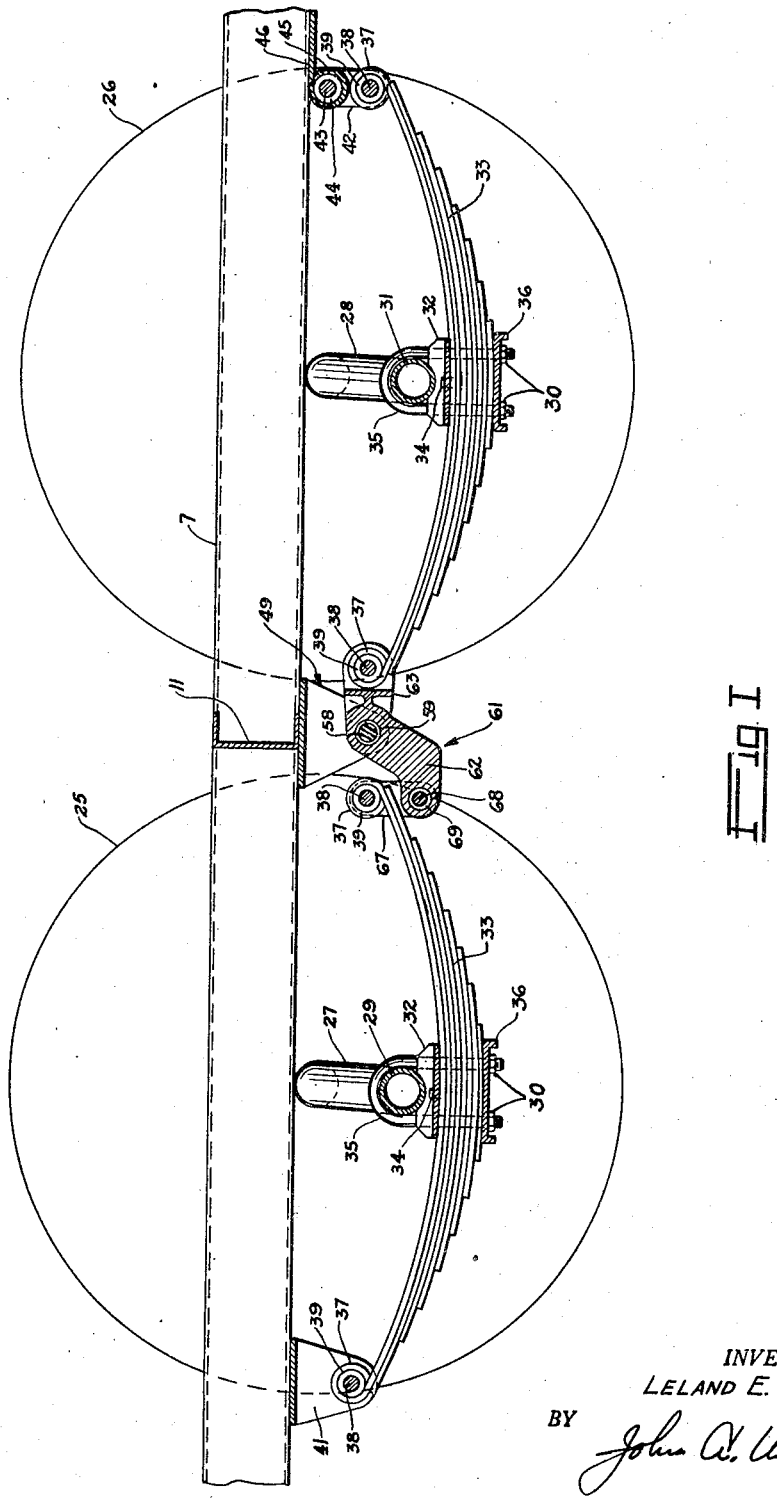
INVENTOR.
LELAND E. LONG
BY
ATTORNEY.

Oct. 12, 1948.   L. E. LONG   2,451,293
SUSPENSION FOR TANDEM WHEELED VEHICLES
Filed June 6, 1946   3 Sheets-Sheet 2
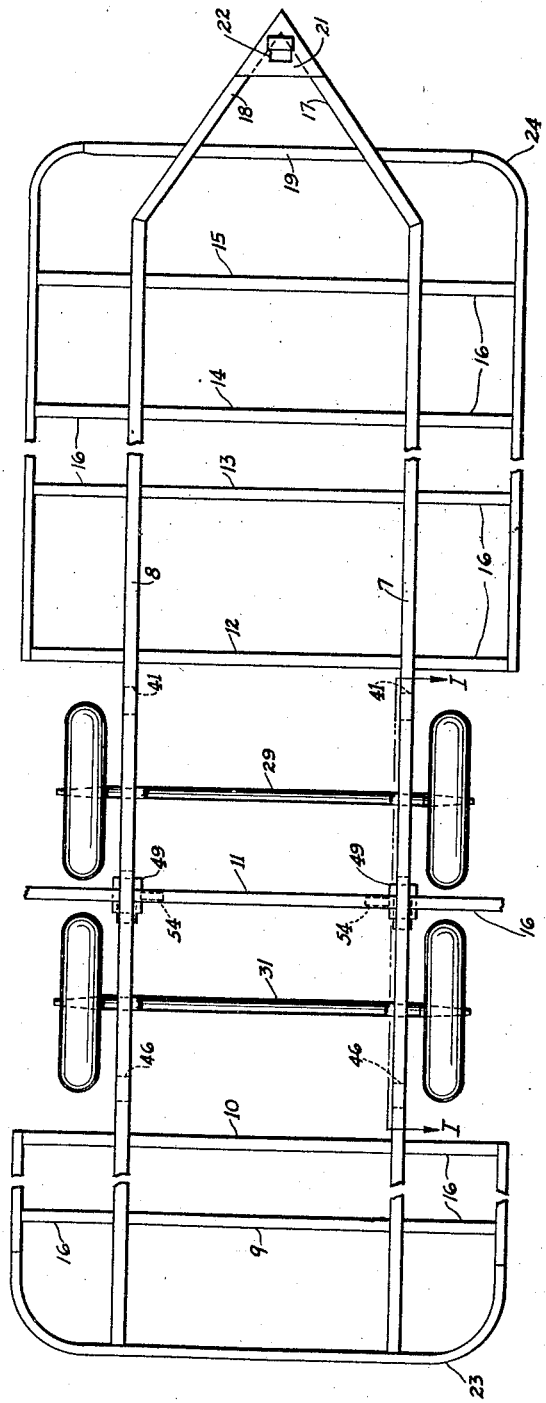
Fig II
INVENTOR.
LELAND E. LONG
BY
ATTORNEY Oct. 12, 1948.  L. E. LONG  2,451,293
SUSPENSION FOR TANDEM WHEELED VEHICLES
Filed June 6, 1946  3 Sheets-Sheet 3
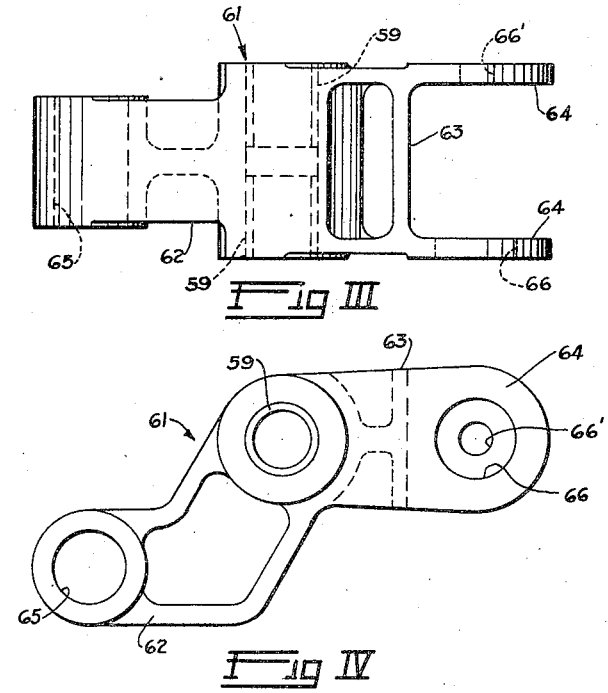
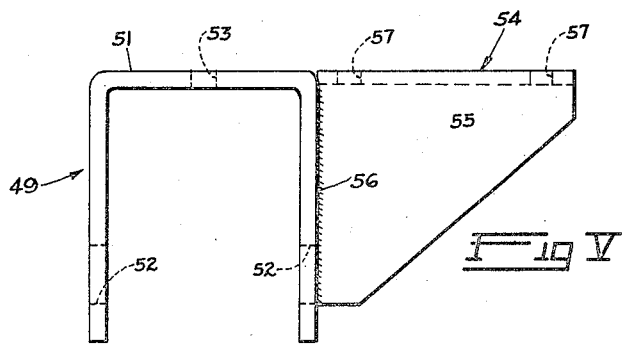
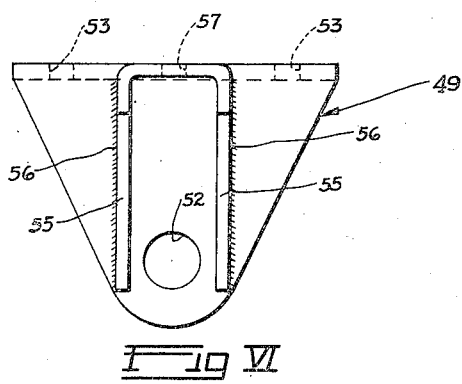
INVENTOR.
LELAND E. LONG
BY
ATTORNEY.

Patented Oct. 12, 1948

2,451,293

UNITED STATES PATENT OFFICE 2,451,293

SUSPENSION FOR TANDEM WHEELED VEHICLES

Leland E. Long, Dayton, Ohio, assignor to The Fayette Manufacturing Company, Fayette, Ohio, a corporation of Ohio Application June 6, 1946, Serial No. 674,775

7 Claims. (Cl. 280—104.5)

The invention here disclosed lies in the art of vehicle supporting mechanisms variously termed "running gear," "suspension mechanism," "undercarriage," et cetera. More particularly, this invention relates to the spring and axle connections with one another and to the vehicle body, chassis frame or the like of tandem axle vehicles. It may be observed, in this connection, that while the invention is disclosed herein in a form especially applicable to tandem axle automobile trailers having what is known as "drop-center" axles, it may be applied to a wide variety of vehicles whether drawn or self-propelled and whether having "drop-center," "drop-spindle," or "straight" axles.

In the design and construction of tandem axle vehicles having independently sprung wheels considerable difficulty has been experienced in providing a construction and arrangement at once simple and economical, and at the same time adequate to meet the requirements of good riding qualities and economy of operation under the almost limitless variety of road and operating conditions to be met. One of the most difficult problems encountered is that of equal distribution of the load of the vehicle body and its contents on the axles, springs and wheels and other parts of the running gear. Absolutely equal distribution of load, while theoretically attainable, is seldom met in actual practice, especially under the usual practices in maintenance and operation. Therefore the designer must seek to provide a construction which will satisfy an optimum number of load conditions and specifications without complicating mechanism and undue expense.

Accordingly, one of the prime objects of the invention is to provide running gear, for tandem wheeled vehicles of the character described, of such nature and construction as not only will minimize the effects of unequal loading of the vehicle, but also will tend to equalize the load upon the several springs, axles and wheels, while, at the same time, give adequate support with a high factor of safety.

Another problem of very material importance involves the design of the running gear to reduce to a minimum, if not completely to eliminate, "bucking" and gyratory and related actions of a trailer when starting, accelerating and stopping, and running under certain types of uneven road surface. The term "bucking" as used herein refers to those resultant motions and effects of a towed or pushed vehicle which arise from the inertia of the vehicle running gear relative to the body and its load, or to unequal momentum effects between the body and running gear, or both. Such effects manifest themselves in various ways as when, for instance, in starting, the trailer body may be set in motion before the rear wheels start to move, in which event the springs may be deflected in such manner as to cause a momentary rise of the body as a whole or a rise or fall of one end relative to the other. Then, as the wheels start in motion the reaction of the body together with the reflex action of the springs not only may cause the body to descend and deflect the springs downwardly below their normal deflected positions, but also may cause the body to tend to move rearward relative to the direction in which it is being drawn. This action not only imposes pushing, jerking, and bouncing effects and stresses on both the tractor and trailer, but may also cause side sway motions, any and all of which induce strains on the tractor and trailer mechanisms, not to mention the effects upon human occupants of either.

To eliminate or minimize the foregoing undesirable body motions relative to the springs, axles, wheels and other parts of a trailer and to provide a design of trailer body supporting and running gear whereby tractive starting, accelerating and stopping or slowing efforts will be smooth and relatively uniform and without "bucking," is another important object of the invention.

Various attempts have been made to attain the objectives, above mentioned, and, although there are several good arrangements in the prior art, the best of such earlier designs sacrificed other desirable and important features such as space, compactness and economy of construction, and added other problems and complications in the attempt. One of the objective features of the present invention lies in the attainment of compactness, with resulting saving of space, and in the avoidance of complicated and expensive constructions.

Many other objects, the advantages and uses of the invention will become apparent from the following description and claims taken in connection with the accompanying drawings in which:

Fig. I is a side elevational view of a portion of a trailer bed or foundation frame to which a running gear constructed in accordance with a preferred form of the invention has been applied, parts being shown in section for clarity of illustration and description.

Fig. II is a top plan view of the trailer bed or foundation frame of Fig. I showing the preferred location of the running gear and its parts with respect to the frame.

Figs. III and IV, respectively, are top plan and side elevation views in detail of the rocker arm or equalizer member to which the front end of the rear spring and the rear end of the front spring are attached, and through which such springs are secured to the vehicle frame; and Figs. V and VI, respectively, are side and front elevational views of a bracket by which the rocker arms or equalizers may be attached to the vehicle frame.

Fig. II illustrates a vehicle frame of one type suitable for use with the invention. This framing comprises a pair of straight, medium gauge, steel or other metal, box-beams 7 and 8 extending in substantially parallel relation to one another longitudinally of the vehicle, cross connecting members 9, 10, 11, 12, 13, 14 and 15 of steel or other metal, of medium gauge and suitable cross-sectional shape, steel or other metal outboard support members 16, box-beam members 17 and 18 of the same material as beams 7 and 8 and forming forwardly converging continuations thereof, a brace member 19 between the members 17 and 18, and a gusset plate 21. These several beams, support members, brace and plate, preferably are formed of medium gauge metal of proper strength and are welded or otherwise connected into a rigid whole. The plate 21 has an aperture 22 through which an adjustable jack (not shown) may be disposed for the support of the front of the trailer when disconnected from a tractor, and the plate may also carry any suitable tractor hitch or connecting means (not shown). Perimeter members 23 and 24 welded to the beams, etc. may complete the frame.

The tandem wheel running gear of the invention preferably is located in the bays formed between the transverse members 10, 11, and 11, 12, and those outboard support members 16 which are aligned with members 10, 11 and 12. This position is rearward of the center of the longitudinal dimension of the trailer frame and body in trailers of the coach type illustrated, but, as the location is approximate only, neither it nor the relative proportions of parts and positions illustrated should be considered as having limiting effect on the invention. In Fig. I, the view of which is taken substantially along the line I—I of Fig. II, looking in the direction of the arrows, the running gear is shown in detail on a large scale and will now be described.

Pneumatic-tired wheels, indicated by the circles 25, 26, are mounted on spindles 27, 28, which are Z-shaped and secured at their inner and lower ends to tubular transverse members 29, 31, the spindles and tubular members together providing "drop-center" axles of the character disclosed in the co-pending application of Long, Serial Number 657,440, filed March 27, 1946. Welded to each axle is a spring pad 32 of U-saddle shape adapted to provide a seat for the top of a leaf spring 33 which carries a centering or positioning pin 34 disposed within a corresponding hole formed in the pad. U-bolts 35 (one on each side of each spring but only one of each pair shown) disposed over the axle with their threaded ends extended through suitable holes in clamp plates 36, and equipped with nuts 30 and lock washers (not shown), serve to clamp the axles and springs securely together in pre-determined positions.

In the preferred (illustrated) form of the invention the springs 33 are of the same weight, set and strength but, if desired, either the forward pair of springs (on axle 29) or the rear pair (on axle 31) may be heavier (greater in weight, set and/or strength) than the other pair. The forward and rear end of each spring terminates in an "eye" 37 which pivots about a pivot pin 38 disposed through a bushing 39 in the spring "eye." The forward "eye" of each front spring is held by its pin 38 in a U-shaped bracket 41 which may be welded or otherwise secured to the bottom surface of box beam 7 or 8, as the case may be, while the rear "eye" of the rear spring on each side is secured by its pin 38 to a pair of shackle links 42 (one only shown) which, in turn, are pivotally secured by pin 43 and bushing 44 to the "eye" 45 of a bracket 46 which may be welded or otherwise secured to the bottom of a box frame member 7 or 8. It is preferred that the axes of pivot 38 in bracket 41 and pivot 38 in shackle 42 lie substantially in the same horizontal plane when the vehicle frame is horizontal and under normal loading, or, that the vertical distance from a base plane, such as the plane of the bottom face of a box frame member 7 or 8, to the axis of pin 38 in bracket 41, be substantially equal to the vertical distance from the same plane to the axis of pin 38 in shackle 42 when the shackle 42 is in such position as to bring the axes of pins 38 and 43 in the shackle into the same plane normal to said horizontal plane.

Intermediate of brackets 41 and 46 and, preferably, disposed directly beneath the longitudinal box-frame member adjoining the connection of the latter to transverse member 11, is a bracket generally designated 49, details of which are shown in Figs. V and VI and to which reference will be made for the moment. A U-shaped saddle portion 51, similar to bracket 41, has its legs drilled or punched to provide aligned or registering holes 52, for the reception of a pivot pin further mentioned hereinafter, and may have its top portion drilled or punched, as indicated at 53, for bolts by which the bracket may be secured to a frame member. In the form of the invention illustrated, however, the holes 53 may be omitted since the bracket is welded to the bottom surface of its box-frame member. For the purpose of adding strength to the bracket to resist bending and torque or twisting moments of force, a brace member 54 of U-shape and having diagonally truncated legs 55 may be welded to the inside leg of bracket 49, as indicated at 56, and will be welded, or bolted through holes 57, to transverse frame member 11, inboard of the adjacent box-frame member.

A pivot pin 58 disposed in and through the holes 52 in the legs of bracket 49 and through bronze or other suitable bushings 59 having a press fit in a hole through an "equalizer" bar or lever 61, pivotally supports the equalizer between the legs of bracket 49. Preferably, the equalizer is formed as a steel casting providing a downwardly (and forwardly) directed arm 62 and a rearwardly extending arm 63, forked as indicated at 64, these arms being drilled as shown at 65 and 66, 66', respectively for the reception of pivot pins and bushings by which the rear end of the front spring and the front end of the rear spring may be connected therewith. The front end of the rear spring is attached direct by its "eye" to the rear arm 63 by means of a pivot pin 38 and a bushing 39, as previously described, but the rear end of the front spring is connected to the equalizer indirectly through the links of a shackle 67, to which it is pivoted, the links, in turn, being pivotally connected with equalizer arm 62 by means of a pivot pin 68 and a bushing 69.

It should be noted (see Fig. I) that the mechanism is depicted in a normal position of rest on a horizontal surface and under normal loading. With the center of the rear "eye" of the front spring normally centered vertically over the pivot center of the connection between shackle 67 and equalizer arm 62, the spring, shackle and equalizer will not "hunt" or fight one another, as would be the case were the rear "eye" pivot of the front spring to be disposed forward of or below the pivot 68 when the parts are under normal or static conditions. In this position also, the axes of pivot pins 38 of the rear "eye" of the front spring and the front 'eye" of the rear spring lie in the same horizontal plane and that the axis of the pivot pin 58 also lies in that same plane. This plane, in turn, lies parallel to and only very slightly below the horizontal plane containing the axes of the pivot pins 38 of the front "eye" of the front spring and the rear "eye" of the rear spring. This arrangement, apart from the advantage gained by drop-center axles, brings the center of gravity of the vehicle frame and body to an exceptionally low level, a condition highly desirable, and, at the same time, avoids complicated, cumbersome and expensive constructions. With the direct connection of the front ends of the front and rear springs to the frame (the axis of front end of the rear spring, normally being in the same horizontal plane as the axis of the fulcrum pivot of the equalizer, provides the equivalent of a direct connection between the front end of the rear spring and the frame), every pulling or retarding force exerted through the frame will be directly communicated simultaneously to the front and rear springs in the same relative directions, as would not be the case were the shackles interposed at these connections, and "bucking" and bouncing and "teeter-totter" actions of the vehicle body are eliminated or reduced to a minimum. The springs do not have to be "canted" at an angle as in certain prior constructions, road shocks imparted to either axle and its wheels and spring are relieved by transmittal, in part, to the other axle, its wheels and spring, and the general "roadability" of the trailer and its tractor are materially improved. Of course there are many other advantages of the invention, as will be apparent to those familiar with the art.

The illustration and the foregoing description of the embodiment chosen for disclosure of the invention should not be considered as limiting since many changes and variations may be accomplished without departing from the invention spirit and the scope of the appended claims.

I claim:

1. A suspension mechanism for a tandem-wheeled vehicle having a relatively rigid body structure and a pair of wheel-carrying axles arranged in parallel-spaced relation to one another and extending transversely of the body structure to provide forward and rear axles, comprising, an elliptical spring for each end of each axle thereby providing a forward and a rear spring for each side of the vehicle, means relatively rigidly securing each axle to and transversely of the mid-portion of each of its springs, means anchoring the forward ends of the forward springs to said body structure for pivotal movements on relatively fixed axes extending transversely of the body structure, a rocker arm pivotally secured intermediately of its ends to each side of said body structure between said forward and rear axles for rocking movements about axes extending transversely of the body structure, means anchoring the forward ends of the rear springs directly to their respectively adjacent rocker arms on axes extending transversely of said body structure and located rearward of the rocker arm pivots, means including shackles pivotally connected to the rear ends of the forward springs on axes normally lying in substantially the same horizontal plane as said rocker arm pivot and pivotally connected to the respectively adjacent rocker arms forward of the rocker arm pivots, and shackle means pivotally connecting the rear ends of the rear springs to said body structure on axes extending transversely of said structure.

2. In a vehicle body supporting mechanism including substantally parallel front and rear axles in tandem and an elliptical spring relatively rigidly secured intermediate of its ends to and transversely of each axle adjacent to each end thereof, means including fixed pivots for anchoring the forward ends of the front axle springs to the vehicle body for pivotal movements of said ends about substantially transverse axes and against substantial movements longitudinally of the vehicle body, bracket means fixedly secured to the vehicle body intermediate of the front and rear axles on each side of said body, a rocker arm on each side of the vehicle body pivotally mounted intermediate of its ends on said bracket means on an axis extending transversely of the vehicle body, means pivotally mounting the forward end of each of the rear springs directly on the respectively adjacent rocker arm on an axis substantially parallel to and in substantially the same horizontal plane with the pivot axis of the rocker arm, means pivotally connected to the rear ends of the forward springs on axes normally lying substantially in said horizontal plane and connected to said rocker arm, and means pivotally connecting the rear ends of the rear springs with said vehicle body on axes extending substantially transversely of the body.

3. In a vehicle supporting mechanism assembly including tandem front and rear axles arranged in parallel relation, each axle having an elliptic spring secured thereto transversely thereof substantially at the mid-section of the spring, means for securing said assembly to a vehicle body comprising, bracket means adapted to be fixedly secured to the vehicle body intermediate of said axles, a relatively rigid member pivotally mounted intermediate of its ends on said bracket means on a relatively fixed axis extending transversely of the vehicle, said rigid member having an arm portion extending generally toward the rear axle and an opposite arm portion extending forwardly and downwardly, means pivotally connecting the rearwardly directed arm directly to the front end of the rear axle spring for movements relative thereto about an axis disposed substantially in parallel with the first said axis and substantially in the same horizontal level with the first said axis when the assembly is under normal loading and in a normal position at rest on a horizontal surface, a link pivotally connected at one end with the forward arm of said member and pivotally connected at its other end with the rear end of the front axle spring on an axis substantially in the same horizontal level with the first axis when the assembly is under normal loading and in a normal position at rest on a horizontal surface, front bracket means adapted to be fixedly secured to the vehicle body adjacent to the front end of the front axle spring, means directly and pivotally connecting the front bracket means and the front end of the front axle spring on a relatively fixed axis, and means pivotally connecting the rear end of the rear spring with a vehicle body.

4. In a vehicle supporting mechanism assembly including tandem front and rear axles arranged in parallel relation, each axle having an elliptic spring secured thereto transversely thereof substantially at the mid-section of the spring, means for securing said assembly to a vehicle body comprising, bracket means adapted to be fixedly secured to the vehicle body intermediate of said axles, a relatively rigid member pivotally mounted on said bracket means on a relatively fixed axis extending transversely of the vehicle, said rigid member having substantially oppositely directed arm portions extending generally toward the front and rear axles, means pivotally connecting the rearwardly directed arm directly to the front end of the rear axle spring for movements relative thereto about an axis disposed substantially in the same horizontal level with the first said axis when the assembly is under normal loading at rest on a horizontal surface, a link pivotally connected at one end with the other arm of said member and pivotally connected at its other end with the rear end of the front axle spring on an axis substantially in the same horizontal level with the first said axis when the assembly is under normal loading at rest on a horizontal surface, front bracket means adapted to be fixedly secured to the vehicle body adjacent to the front end of the front axle spring, means pivotally connecting the front bracket means and the front end of the front axle spring on a relatively fixed axis extending substantially parallel to the axis of pivotal connection between the rear end of the same spring and said link, and means for pivotally connecting the rear end of the rear spring with a vehicle body.

5. In a vehicle supporting mechanism including substantially parallel fore and rear axles in tandem assembly and a pair of elliptical springs for each side of the vehicle, one spring of each pair for each axle, each spring being secured to its axle transversely thereof at its mid-section and oriented to extend generally fore and aft of the vehicle, means for pivotally connecting the front end of each spring to the vehicle so as to exert a substantially direct and simultaneous pull of substantially equal force upon each spring and through the springs to the axles under tractive effort applied to the vehicle in the normal direction of vehicle movement, means including members pivotally secured to the vehicle and links connected with said members for pivotally connecting the rear ends of the front springs to the front of the rear springs on pivot axes lying in substantially the same horizontal level with the axes of the pivotal connections between the forward ends of the rear springs and the vehicle when the assembly is under normal loading and in a normal position at rest on a horizontal surface, and link means for pivotally connecting the rear ends of the rear springs to the vehicle.

6. In a vehicle supporting mechanisms including fore and rear axles in tandem assembly and an elliptic leaf spring for each axle, each spring being secured intermediate of its ends to its axle transversely of the latter and oriented to extend generally fore and aft of the vehicle when mounted thereon, a rocker pivotally supported upon the vehicle intermediate of said springs and having an arm extending forwardly and an arm extending rearwardly from its pivot, means pivotally connecting the forward end of the front spring to the vehicle and the forward end of the rear spring to the vehicle through a pivotal connection with the rearwardly extending arm of said rocker on pivot axes substantially in line with one another and with the pivot axis of the said rocker, means pivotally connecting the rear end of the front spring with said forwardly extending arm on an axis substantially in line with the other said axes when the vehicle is under normal loading on a level surface, and a pivoted link connecting the rear end of the rear spring with said vehicle.

7. In a vehicle supporting mechanism including fore and rear axles in tandem assembly and an elliptic leaf spring for each axle, each spring being secured intermediate of its ends to its axle transversely of the latter and oriented to extend generally fore and aft of the vehicle when mounted thereon, a rocker pivotally supported upon the vehicle intermediate of said springs and having an arm extending forwardly and downwardly and an arm extending rearwardly from its pivot, means pivotally connecting the forward end of the front spring to the vehicle and the forward end of the rear spring to the vehicle through a pivotal connection with the rearwardly extending arm of said rocker on pivot axes substantially in line with one another and with the pivot axis of the said rocker, link means pivotally connected to the rear end of the front spring on an axis substantially in line with the other said axes when the vehicle is under normal loading on a level surface, said link being also pivotally connected to said forwardly and downwardly extending arm, and a second pivoted link connecting the rear end of the rear spring with said vehicle.

LELAND E. LONG.

REFERENCES CITED

The following references are of record in the file of this patent:

UNITED STATES PATENTS

| Number | Name | Date |
| --- | --- | --- |
| 1,745,433 | Marcum | Feb. 4, 1930 |
| 2,251,360 | Knox | Aug. 5, 1941 |

Certificate of Correction

Patent No. 2,451,293.   October 12, 1948.

LELAND E. LONG

It is hereby certified that errors appear in the printed specification of the above numbered patent requiring correction as follows:

Column 6, line 72, claim 3, after the word "first" insert *said*; column 8, line 5, claim 6, for "mechanisms" read *mechanism*;

and that the said Letters Patent should be read with these corrections therein that the same may conform to the record of the case in the Patent Office.

Signed and sealed this 4th day of January, A. D. 1949.

[SEAL]

THOMAS F. MURPHY,
*Assistant Commissioner of Patents.*